(12) United States Patent
Ettireddy et al.

(10) Patent No.: US 8,491,845 B2
(45) Date of Patent: Jul. 23, 2013

(54) LOW TEMPERATURE SELECTIVE CATALYTIC REDUCTION CATALYST AND ASSOCIATED SYSTEMS AND METHODS

(75) Inventors: Padmanabha Reddy Ettireddy, Columbus, IN (US); Matthew Henrichsen, Columbus, IN (US)

(73) Assignee: Cummins IP, Inc., Minneapolis, MN (US)

( * ) Notice: Subject to any disclaimer, the term of this patent is extended or adjusted under 35 U.S.C. 154(b) by 94 days.

(21) Appl. No.: 12/879,776

(22) Filed: Sep. 10, 2010

(65) Prior Publication Data

US 2011/0058999 A1    Mar. 10, 2011

Related U.S. Application Data

(60) Provisional application No. 61/241,312, filed on Sep. 10, 2009.

(51) Int. Cl.
*B01D 50/00*    (2006.01)
*B01J 23/00*    (2006.01)
*F01N 3/00*    (2006.01)

(52) U.S. Cl.
USPC .............................. 422/177; 502/300; 60/286

(58) Field of Classification Search
USPC .................................................. 422/177, 180
See application file for complete search history.

(56) References Cited

U.S. PATENT DOCUMENTS

| | | | |
|---|---|---|---|
| 4,314,345 A | 2/1982 | Shiraishi et al. |
| 5,552,128 A | 9/1996 | Chang et al. |
| 5,809,775 A | 9/1998 | Tarabulski et al. |
| 6,109,024 A | 8/2000 | Kinugasa et al. |
| 6,125,629 A | 10/2000 | Patchett |
| 6,182,443 B1 | 2/2001 | Jarvis et al. |
| 6,266,955 B1 | 7/2001 | Liang et al. |
| 6,269,633 B1 | 8/2001 | van Nieuwstadt et al. |
| 6,295,809 B1 | 10/2001 | Hammerle et al. |
| 6,311,484 B1 | 11/2001 | Roth et al. |
| 6,375,828 B2 | 4/2002 | Ando et al. |
| 6,415,602 B1 | 7/2002 | Patchett et al. |
| 6,446,430 B1 | 9/2002 | Roth et al. |
| 6,546,720 B2 | 4/2003 | van Nieuwstadt |
| 6,581,374 B2 | 6/2003 | Patchett et al. |

(Continued)

FOREIGN PATENT DOCUMENTS

| CN | 1804378 A | 7/2006 |
|---|---|---|
| CN | 1809685 A | 7/2006 |

(Continued)

OTHER PUBLICATIONS

PCT/US2009/067023, International Search Report and Written Opinion, Jul. 13, 2010.

(Continued)

*Primary Examiner* — Tom Duong
(74) *Attorney, Agent, or Firm* — Kunzler Law Group, PC

(57) ABSTRACT

According to one embodiment, described herein is an exhaust gas after-treatment system that is coupleable in exhaust gas stream receiving communication with an internal combustion engine. The exhaust gas after-treatment system includes a low temperature SCR catalyst configured to reduce $NO_x$ in exhaust gas having a temperature below a temperature threshold. The system also includes a normal-to-high temperature SCR catalyst configured to reduce $NO_x$ in exhaust gas having a temperature above the temperature threshold.

16 Claims, 5 Drawing Sheets

U.S. PATENT DOCUMENTS

| | | | |
|---|---|---|---|
| 6,662,553 | B2 | 12/2003 | Patchett et al. |
| 6,701,707 | B1 | 3/2004 | Upadhyay et al. |
| 6,713,030 | B1 | 3/2004 | Chandler et al. |
| 6,742,326 | B2 | 6/2004 | Xu et al. |
| 6,742,330 | B2 | 6/2004 | Genderen |
| 6,829,885 | B2 | 12/2004 | Surnilla et al. |
| 6,882,929 | B2 | 4/2005 | Liang et al. |
| 6,892,530 | B2 | 5/2005 | Montreuil et al. |
| 6,901,745 | B2 | 6/2005 | Schnaibel et al. |
| 6,928,806 | B2 | 8/2005 | Tennison et al. |
| 6,981,368 | B2 | 1/2006 | van Nieuwstadt et al. |
| 6,993,900 | B2 | 2/2006 | Upadhyay et al. |
| 7,017,389 | B2 | 3/2006 | Gouma |
| 7,063,642 | B1 | 6/2006 | Hu et al. |
| 7,093,427 | B2 | 8/2006 | van Nieuwstadt et al. |
| 7,113,835 | B2 | 9/2006 | Boyden et al. |
| 7,117,046 | B2 | 10/2006 | Boyden et al. |
| 7,134,273 | B2 | 11/2006 | Mazur et al. |
| 7,150,145 | B2 | 12/2006 | Patchett et al. |
| 7,168,243 | B2 | 1/2007 | Endicott et al. |
| 7,178,328 | B2 | 2/2007 | Solbrig |
| 7,204,081 | B2 | 4/2007 | Yasui et al. |
| 7,213,395 | B2 | 5/2007 | Hu et al. |
| 7,263,825 | B1 | 9/2007 | Wills et al. |
| 7,293,410 | B2 | 11/2007 | Miura |
| 7,320,781 | B2 | 1/2008 | Lambert et al. |
| 7,332,135 | B2 | 2/2008 | Gandhi et al. |
| 7,485,272 | B2 | 2/2009 | Driscoll et al. |
| 7,603,846 | B2 | 10/2009 | Lueders et al. |
| 7,628,009 | B2 | 12/2009 | Hu et al. |
| 7,631,490 | B2 | 12/2009 | Colignon |
| 7,650,746 | B2 | 1/2010 | Hu et al. |
| 7,685,813 | B2 | 3/2010 | McCarthy, Jr. |
| 7,802,419 | B2 | 9/2010 | Doring |
| 7,832,200 | B2 | 11/2010 | Kesse et al. |
| 7,861,518 | B2 | 1/2011 | Federle |
| 7,892,508 | B2 | 2/2011 | Katoh |
| 7,950,222 | B2 | 5/2011 | Hodzen |
| 7,997,070 | B2 | 8/2011 | Yasui et al. |
| 8,020,374 | B2 | 9/2011 | Walz et al. |
| 8,061,126 | B2 | 11/2011 | Gady et al. |
| 8,074,445 | B2 | 12/2011 | Ofoli et al. |
| 2002/0044897 | A1 | 4/2002 | Kakwani et al. |
| 2003/0177766 | A1 | 9/2003 | Wang |
| 2003/0182935 | A1 | 10/2003 | Kawai et al. |
| 2004/0098968 | A1 | 5/2004 | van Nieuwstadt et al. |
| 2004/0112046 | A1 | 6/2004 | Tumati et al. |
| 2004/0128982 | A1 | 7/2004 | Patchett et al. |
| 2005/0260761 | A1 | 11/2005 | Lanier et al. |
| 2005/0282285 | A1 | 12/2005 | Radhamohan et al. |
| 2006/0086080 | A1 | 4/2006 | Katogi et al. |
| 2006/0130458 | A1 | 6/2006 | Solbrig |
| 2006/0144038 | A1 | 7/2006 | Miura |
| 2006/0155486 | A1 | 7/2006 | Walsh et al. |
| 2006/0212140 | A1 | 9/2006 | Brackney |
| 2007/0044456 | A1 | 3/2007 | Upadhyay et al. |
| 2007/0137181 | A1 | 6/2007 | Upadhyay et al. |
| 2007/0137184 | A1 | 6/2007 | Patchett et al. |
| 2007/0214777 | A1 | 9/2007 | Allansson et al. |
| 2007/0295003 | A1 | 12/2007 | Dingle et al. |
| 2008/0022658 | A1 | 1/2008 | Viola et al. |
| 2008/0022659 | A1 | 1/2008 | Viola et al. |
| 2008/0031793 | A1 | 2/2008 | DiFrancesco et al. |
| 2008/0060348 | A1 | 3/2008 | Robel et al. |
| 2008/0066455 | A1 | 3/2008 | Viola |
| 2008/0250774 | A1 | 10/2008 | Solbrig |
| 2008/0250778 | A1 | 10/2008 | Solbrig |
| 2008/0295499 | A1 | 12/2008 | Driscoll et al. |
| 2009/0214397 | A1* | 8/2009 | Shirono et al. ............ 422/177 |
| 2009/0272099 | A1 | 11/2009 | Garimella et al. |
| 2009/0272101 | A1 | 11/2009 | Wills et al. |
| 2009/0272104 | A1 | 11/2009 | Garimella et al. |
| 2009/0272105 | A1 | 11/2009 | Chi et al. |
| 2009/0301066 | A1 | 12/2009 | Sindano et al. |
| 2010/0024390 | A1 | 2/2010 | Wills et al. |
| 2010/0024393 | A1 | 2/2010 | Chi et al. |
| 2010/0024397 | A1 | 2/2010 | Chi et al. |
| 2010/0028230 | A1 | 2/2010 | Gady et al. |
| 2010/0043404 | A1 | 2/2010 | Hebbale et al. |
| 2010/0122526 | A1 | 5/2010 | VanderVeen et al. |
| 2010/0229531 | A1 | 9/2010 | Chi et al. |
| 2010/0242438 | A1 | 9/2010 | Mital |
| 2010/0242440 | A1 | 9/2010 | Garimella et al. |
| 2010/0275583 | A1 | 11/2010 | Farrell et al. |
| 2011/0262329 | A1 | 10/2011 | Ofoli et al. |

FOREIGN PATENT DOCUMENTS

| | | | |
|---|---|---|---|
| EP | 1129278 | B1 | 8/2003 |
| EP | 1338562 | A1 | 8/2003 |
| EP | 1083979 | B1 | 6/2004 |
| EP | 1431533 | | 6/2004 |
| EP | 1339955 | B1 | 8/2005 |
| EP | 1609977 | A2 | 12/2005 |
| EP | 1672192 | A1 | 6/2006 |
| EP | 1712764 | A1 | 10/2006 |
| JP | 10118492 | A | 5/1998 |
| JP | 10288030 | A * | 10/1998 |
| JP | 2002327617 | | 11/2002 |
| JP | 2004100700 | | 4/2004 |
| JP | 2007255367 | | 10/2007 |
| KR | 1020010043138 | | 5/2001 |
| KR | 1020030034139 | | 5/2003 |
| KR | 1020080030163 | A | 4/2008 |
| KR | 1020100061145 | | 11/2008 |
| WO | 9955446 | | 11/1999 |
| WO | 0214657 | A1 | 2/2002 |
| WO | 2004000443 | A1 | 12/2003 |
| WO | 2006000877 | A3 | 1/2006 |
| WO | 2007014649 | A1 | 2/2007 |
| WO | 2007066502 | A1 | 6/2007 |
| WO | 2008009940 | A2 | 1/2008 |

OTHER PUBLICATIONS

PCT/US2009/042423, International Search Report and Written Opinion, Nov. 27, 2009.
PCT/US2009/067020, International Search Report and Written Opinion, Jul. 13, 2010.
Control of a Urea SCR Catalytic Converter System for a Mobile Heavy Duty Diesel Engine—C.M. Schar, C.H. Onder, H.P. Geering and M. Elsener—SAE 2003-01-0776, Mar. 3-6, 2003.
PCT/US2009/042409, International Search Report and Written Opinion, Nov. 25, 2009.
U.S. Appl. No. 12/433,586 Office Action.
U.S. Appl. No. 12/632,628 Office Action.
U.S. Appl. No. 12/112,795 Notice of Allowance.
U.S. Appl. No. 12/433,705 Notice of Allowance.
U.S. Appl. No. 12/433,767 Office Action.
PCT/US2011/033767 International Search Report and Written Opinion, Feb. 8, 2012.
PCT/US2010/048502, International Search Report and Written Opinion, May 23, 2011.
U.S. Appl. No. 12/632,646 Notice of Allowance mailed Jun. 4, 2012.
U.S. Appl. No. 12/433,586 Notice of Allowance mailed Jul. 12, 2012.
U.S. Appl. No. 12/433,730 Office Action mailed May 10, 2012.
U.S. Appl. No. 12/433,767 Notice of Allowance mailed Aug. 3, 2012.
U.S. Appl. No. 12/767,664 Office Action mailed Aug. 3, 2012.
Chinese Patent Application No. 200980115540.1 Office Action mailed Jun. 26, 2012.
P.R. Ettireddy et al. "Surface characterization studies of TiO2 supported manganese oxide catalysts for low temperature SCR of NO with NH3" Applied Catalysis B, 76 (2007).
D.A. Pena, et al. "Identification of Surface Species on Titania-Supported Manganese, Chromium, and Copper Oxide Low-Temperature SCR Catalysts": Journal of Physical Chemistry B, 108 (2004) 9927-9936.
PCT/US2009/042419 International Search Report and Written Opinion, Jan. 27, 2010.
PCT/US2009/042412 International Search Report and Written Opinion, Dec. 16, 2009.
PCT/US2009/042321 International Search Report and Written Opinion, Dec. 14, 2009.
PCT/US2009/042335 International Search Report and Written Opinion, Dec. 14, 2009.

PCT/US2009/042330 International Search Report and Written Opinion, Dec. 17, 2009.
PCT/US2009/042340 International Search Report and Written Opinion, Dec. 16, 2009.
U.S. Appl. No. 12/433,600 Notice of Allowance.
U.S. Appl. No. 12/112,500 Office Action.
U.S. Appl. No. 12/112,500 Notice of Allowance.
U.S. Appl. No. 12/112,622 Office Action.
U.S. Appl. No. 12/112,622 Notice of Allowance.
U.S. Appl. No. 12/112,678 Office Action.
U.S. Appl. No. 12/112,678 Final Office Action.
U.S. Appl. No. 12/112,795 Office Action.
U.S. Appl. No. 12/433,705 Office Action.
U.S. Appl. No. 12/433,730 Office Action.
PCT/US2009/042406 International Search Report and Written Opinion, Dec. 18, 2009.
U.S. Appl. No. 12/112,678 Notice of Allowance.
U.S. Appl. No. 12/433,730 Final Office Action mailed Oct. 9, 2012.
U.S. Appl. No. 12/632,628 Notice of Allowance.

* cited by examiner

LOW TEMPERATURE SELECTIVE CATALYTIC REDUCTION CATALYST AND ASSOCIATED SYSTEMS AND METHODS

CROSS-REFERENCE TO RELATED APPLICATION

This application claims the benefit of U.S. Provisional Patent Application No. 61/241,312, filed Sep. 10, 2009, which is incorporated herein by reference.

FIELD

This disclosure relates to exhaust gas after-treatment systems, and more particularly to selective catalytic reduction (SCR) systems having multiple SCR catalysts.

BACKGROUND

Conventional SCR systems include SCR catalysts configured to effectively reduce $NO_x$ from exhaust gas streams during operation in normal-to-high exhaust temperature ranges (e.g., between about 250° C. and about 450° C.). However, during cold starts of an engine when exhaust gas temperatures may fall within low exhaust temperature ranges (e.g., between about 60° C. and about 250° C.), conventional SCR catalysts fail to effectively reduce $NO_x$ from exhaust gas streams. This is because at low temperature ranges, the engine typically does not generate enough $NO_2$ (and oxidation catalysts do not convert enough NO to $NO_2$) for effective $NO_x$ reduction, and it is difficult to provide enough ammonia for effective $NO_x$ reduction. To convert more NO to $NO_2$ in low exhaust temperature operating ranges, an oxidation catalyst may be infused with large quantities of platinum. Such oxidation catalysts can be expensive and may introduce additional drawbacks.

Additionally, for effective $NO_x$ reduction in low exhaust temperature operation of an engine, conventional SCR systems require adjustment or retuning of the engine operating conditions to artificially increase the exhaust temperature and amount of $NO_2$. Reconfiguring the operation of the engine to increase exhaust temperature and $NO_2$ generation can result in excess exhaust pollutants (e.g., $NO_x$ and particulate matter) and fuel consumption, as well as lower engine durability.

Other approaches to reducing $NO_x$ in low exhaust temperature ranges may involve using different materials in the SCR catalysts. However, such approaches do not provide for sufficient $NO_x$ reduction at lower temperatures (e.g., between about 60° C. and about 250° C.). Additionally, known SCR catalysts using different materials tend to only trap $NO_x$ in ammonia nitrate, which can clog the SCR catalyst, rather than reducing the $NO_x$ to nitrogen and water.

SUMMARY

The subject matter of the present application has been developed in response to the present state of the art, and in particular, in response to the problems and needs in the art that have not yet been fully solved by currently available selective catalytic reduction (SCR) systems. Accordingly, the subject matter of the present application has been developed to provide an SCR catalyst and associated systems and methods for reducing pollutants during low exhaust temperature operation of an engine that overcomes at least some of the shortcomings of the prior art.

Described herein are various embodiments of a low temperature SCR catalyst and associated systems and methods.

According to some embodiments, the low temperature SCR catalyst forms part of an internal combustion engine system that includes an exhaust after-treatment system coupled to an internal combustion engine. The after-treatment system includes various components, such as an oxidation catalyst (e.g., a diesel oxidation catalyst (DOC)), a diesel particulate filter (DPF), and an SCR system. The SCR system includes a low temperature SCR catalyst, normal-to-high temperature SCR catalyst, and reductant delivery system. In one implementation, the SCR system includes a bypass valve upstream of the normal-to-high SCR catalyst to divert at least a portion of exhaust gas through the low temperature SCR catalyst before passing through the normal-to-high SCR catalyst.

The low temperature SCR catalyst is comprised of a unique combination of single and mixed transition metals loaded on a selected one of several oxides. The transition metal and oxide combinations of the present disclosure provide effective reduction of $NO_x$ in an exhaust gas stream at low temperatures (e.g., between about 60° C. and about 250° C. in some implementations, and between about 60° C. and 150° C. in other implementations). Additionally, in certain implementations, the transition metal and oxide combinations have a relatively low affinity for various substances that inhibit $NO_x$ reduction on an SCR catalyst, such as sulfur dioxide ($SO_2$) and water. Further, in some implementations, the lower temperature SCR catalyst of the present disclosure is mechanically stable at high exhaust temperatures (e.g., up to about 450° C.). Also, with a low temperature SCR catalyst of the present disclosure, a DOC of the after-treatment system need not include additional amounts of platinum for NO to $NO_2$ conversion as the low temperature SCR catalyst does not need as much $NO_2$ as traditional catalysts for $NO_x$ reduction.

According to one specific embodiment, a selective catalytic reduction (SCR) catalyst includes a carrier layer and a catalytic layer coupled to the carrier layer. The carrier layer is made from at least one of $TiO_2$, $Al_2O_3$, $SiO_2$, $ZrO_2$, $GaO_2$, $TiO_2$—$Al_2O_3$, $TiO_2$—$SiO_2$, $TiO_2$—$GaO_2$, $TiO_2$—$ZrO_2$, $CeO_2$—$CeO_2$—$ZrO_2$, $Al_2O_3$—$SiO_2$, $Al_2O_3$—$ZrO_2$, $TiO_2$—$SiO_2$—$ZrO_2$, and $TiO_2$—$Al_2O_3$—$SiO_2$. The catalytic layer is made from at least one of V, Cr, Mn, Fe, Co, Ni, Cu, Zn, Mo, Ag, Ge, and Nb. Yhe combined carrier layer and catalytic layer are configured to reduce $NO_x$ in an exhaust gas stream at an exhaust temperature between about 60° C. and about 250° C.

In one implementation of the SCR catalyst, the carrier layer is made from $TiO_2$ and the catalytic layer is made from one of Mn, Cr, Cu, Co, Fe, V, and Ni. In another implementation of the SCR catalyst, the carrier layer is made from $TiO_2$ and the catalytic layer is made from Mn. In yet another implementation of the SCR catalyst, the carrier layer is made from $TiO_2$ and the catalytic layer is made from Cr. In certain implementations, the carrier layer is made from $TiO_2$ and the catalytic layer is made from Cu. The combined carrier layer and catalytic layer can be configured to reduce 100% of $NO_x$ in an exhaust stream at an exhaust temperature less than about 175° C.

According to another embodiment, described herein is an exhaust gas after-treatment system that is coupleable in exhaust gas stream receiving communication with an internal combustion engine. The system includes a low temperature SCR catalyst configured to reduce $NO_x$ in exhaust gas having a temperature below a temperature threshold. The system also includes a normal-to-high temperature SCR catalyst configured to reduce $NO_x$ in exhaust gas having a temperature above the temperature threshold. The temperature threshold can be between about 150° C. and about 250° C. In some instances, the temperature threshold can be a degradation temperature of the low temperature SCR catalyst.

In certain implementations, the system further includes an exhaust bypass valve that is configured to direct at least a portion of an exhaust gas stream through the low temperature SCR catalyst if a temperature of the exhaust gas stream is below the temperature threshold. The bypass valve is further configured to direct the entire exhaust gas stream through the normal-to-high temperature SCR catalyst if the temperature of the exhaust gas stream is above the temperature threshold. The bypass valve can be positioned upstream of the low and normal-to-high temperature SCR catalysts and the low temperature SCR catalyst can be positioned upstream of the normal-to-high temperature SCR catalyst.

According to some implementations of the system, the bypass valve is configured to direct the entire exhaust gas stream through the low temperature SCR catalyst if a temperature of the exhaust gas stream is below a minimum operating temperature of the normal-to-high temperature SCR catalyst. The minimum operating temperature can be lower than the temperature threshold. The bypass valve can incrementally decrease the amount of the exhaust gas stream flowing into the low temperature SCR catalyst from 100% to 0% of the exhaust gas stream as the temperature of the exhaust gas stream correspondingly increases from the minimum operating temperature to the temperature threshold. Similarly, the bypass valve can incrementally decrease the amount of the exhaust gas stream flowing into the low temperature SCR catalyst from 0% to 100% of the exhaust gas stream as the temperature of the exhaust gas stream correspondingly decreases from the temperature threshold to the minimum operating temperature.

In certain implementations, the normal-to-high temperature SCR catalyst is positioned downstream of the low temperature SCR catalyst and receives all of the exhaust gas that flows through the low temperature SCR catalyst. In certain other implementations, the low temperature SCR catalyst is positioned downstream of the normal-to-high temperature SCR catalyst and receives all of the exhaust gas that flows through the normal-to-high temperature SCR catalyst.

According to one embodiment, a method for treating an exhaust gas stream includes providing an exhaust after-treatment system comprising a low temperature SCR catalyst and a normal-to-high temperature SCR catalyst. The method further includes reducing $NO_x$ in an exhaust gas stream with the low temperature SCR catalyst if a temperature of the exhaust gas stream is within a low temperature range. Additionally, the method includes reducing $NO_x$ in the exhaust gas stream with the normal-to-high temperature SCR catalyst if the temperature of the exhaust gas stream is within a normal-to-high temperature range. The method can include passing the entire exhaust gas stream through the normal-to-high temperature SCR catalyst. Additionally, the method can include diverting at least a portion of the exhaust gas stream through the low temperature SCR catalyst before the portion passes through the normal-to-high temperature SCR catalyst if the temperature of the exhaust gas stream is within the low temperature range. According to some implementations, the entire exhaust gas stream is passed through the normal-to-high temperature SCR catalyst prior to the entire exhaust gas stream passing through the low temperature SCR catalyst.

Reference throughout this specification to features, advantages, or similar language does not imply that all of the features and advantages that may be realized with the present disclosure should be or are in any single embodiment or implementation of the disclosure. Rather, language referring to the features and advantages is understood to mean that a specific feature, advantage, or characteristic described in connection with an embodiment is included in at least one embodiment of the present disclosure. Discussion of the features and advantages, and similar language, throughout this specification may, but do not necessarily, refer to the same embodiment or implementation.

The described features, advantages, and characteristics of the present disclosure may be combined in any suitable manner in one or more embodiments and/or implementations. One skilled in the relevant art will recognize that the subject matter of the present disclosure may be practiced without one or more of the specific features or advantages of a particular embodiment or implementation. In other instances, additional features and advantages may be recognized in certain embodiments and/or implementations that may not be present in all embodiments or implementations. These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The described features, structures, or characteristics of the subject matter described herein may be combined in any suitable manner in one or more embodiments. In the following description, numerous specific details are provided to impart a thorough understanding of embodiments of the disclosure. One skilled in the relevant art will recognize, however, that the subject matter of the present disclosure may be practiced without one or more of the specific details, or with other methods, components, materials, and so forth. In other instances, well-known structures, materials, or operations are not shown or described in detail to avoid obscuring aspects of the disclosure.

Figure 1:
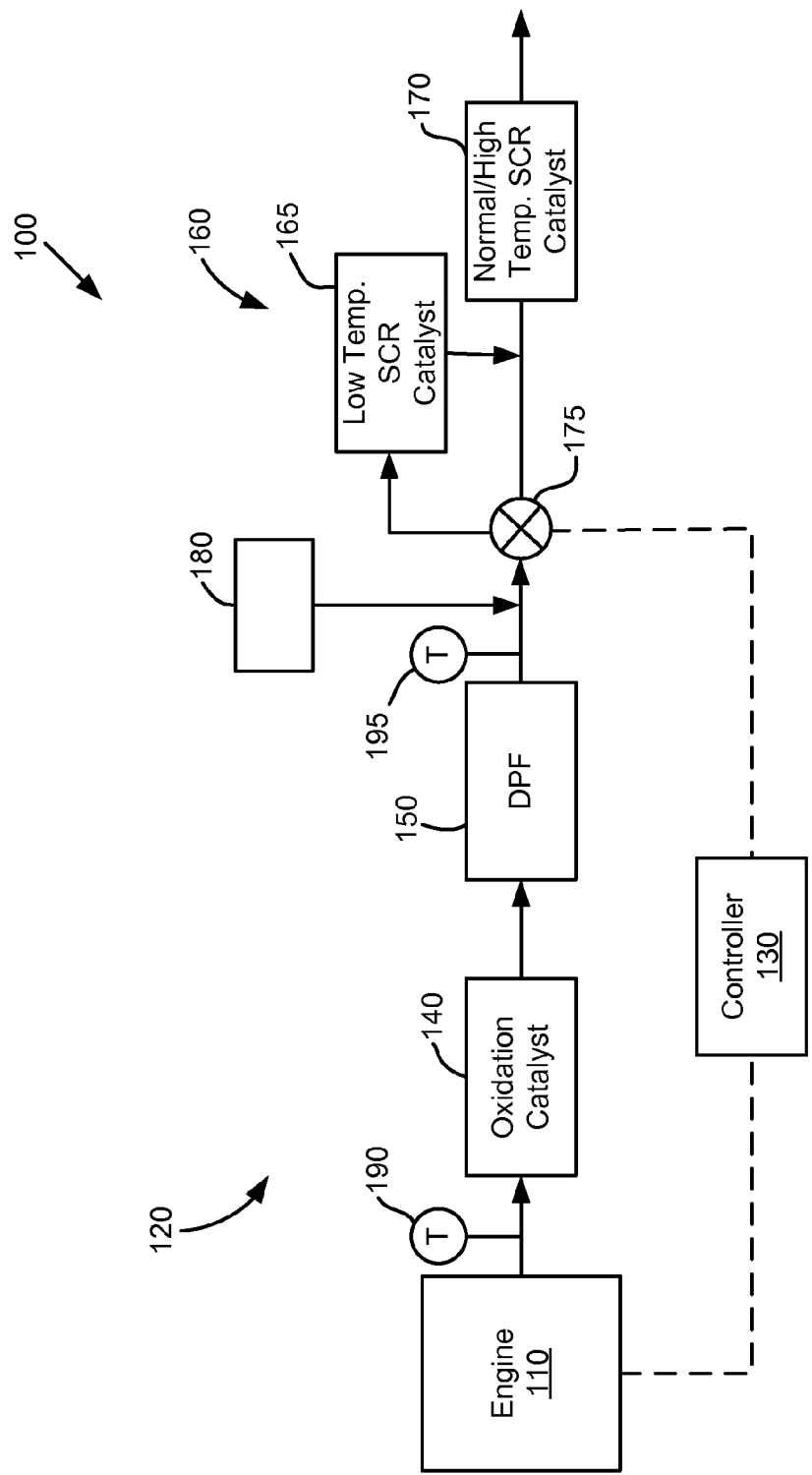
FIG. 1 is a schematic block diagram of an internal combustion engine system having an exhaust after-treatment system with a low temperature SCR catalyst, bypass valve, and normal-to-high temperature SCR catalyst according to one representative embodiment.

FIG. 1 depicts one embodiment of an internal combustion engine system 100. The main components of the engine system 100 include an internal combustion engine 110, an exhaust gas after-treatment system 120 coupled to the engine, and a controller 130 in electronic communication with the engine 110 and after-treatment system 120.

The internal combustion engine 110 can be a compression-ignited internal combustion engine, such as a diesel fueled engine, or a spark-ignited internal combustion engine, such as a gasoline fueled engine operated lean. Within the internal combustion engine 110, air from the atmosphere is combined with fuel to power the engine. Combustion of the fuel and air produces exhaust gas that is operatively vented to an exhaust manifold. From the exhaust manifold, at least a portion of the generated exhaust gas flows into and through the exhaust gas after-treatment system 120 via exhaust gas lines as indicated by the direction arrows intermediate the various components of the system 100. Although not shown, the engine system 100 may also include a turbocharger operatively coupled to the exhaust gas line between the engine 110 and the oxidation catalyst 140. Exhaust flowing through the turbocharger may power a turbine of the turbocharger, which drives a compressor of the turbocharger for compressing engine intake air.

Generally, the exhaust gas after-treatment system 120 is configured to reduce the number of pollutants contained in the exhaust gas generated by the engine 110 before venting the exhaust gas into the atmosphere. As exemplary of one particular embodiment, the exhaust gas after-treatment system 120 includes a diesel oxidation catalyst (DOC) 140, a diesel particulate filter (DPF) 150, and an SCR system 160. In the illustrated embodiment, the DOC 140 is positioned upstream of the DPF 150 and the DPF 150 is positioned upstream of the SCR system 160. The after-treatment system 120 can include additional components, such as additional DOCs, DPFs, and SCR systems, or other components, such as ammonia oxidation (AMOX) catalysts.

The DOC 140 can be any of various flow-through, diesel oxidation catalysts or other oxidation catalysts known in the art. Generally, the DOC 140 is configured to oxidize at least some particulate matter, e.g., the soluble organic fraction of soot, and NO in the exhaust and reduce unburned hydrocarbons and CO in the exhaust to less environmentally harmful compounds. For example, the DOC 140 may sufficiently reduce the hydrocarbon and CO concentrations in the exhaust to meet the requisite emissions standards. The exhaust after-treatment system 120 can also include a reactant delivery system (not shown) for introducing a hydrocarbon reactant, such as fuel, into the exhaust gas prior to passing through the DOC 140. Generally, the reactant may facilitate oxidation of various chemical compounds adsorbed within the DOC 140, facilitate regeneration of the DPF 150, and effectively increase the exhaust gas temperature. Alternative, or in addition, to a reactant delivery system, the controller 130 can be configured to implement a fuel injection timing strategy for injecting fuel into the combustion chambers of the engine 110 that results in excess unburned fuel in the exhaust gas exiting the engine 110. The unburned fuel acts much in the same way as fuel injected into the exhaust gas via the reductant delivery system to provide an environment conducive to oxidation and regeneration.

The DPF 150 can be any of various particulate filters known in the art configured to reduce particulate matter concentrations, e.g., soot and ash, in the exhaust gas to meet requisite emission standards. The DPF 150 can be electrically coupled to a controller, such as controller 130, that controls various characteristics of the particulate filter, such as, for example, the timing and duration of filter regeneration events.

The SCR system 160 includes a low temperature SCR catalyst 165 and a normal-to-high temperature SCR catalyst 170. As shown in FIG. 1, the low temperature SCR catalyst 165 is positioned upstream of the normal-to-high temperature SCR catalyst 170. The details of the low temperature SCR catalyst 165 are described in more detail below. In certain implementations, the normal-to-high temperature SCR catalyst 170 can be a traditional SCR catalyst known in the art. For example, in some implementations, the normal-to-high temperature SCR catalyst 170 is a vanadium-based catalyst, and in other implementations, the SCR catalyst 170 is a zeolite-based catalyst, such as a Cu-Zeolite or a Fe-Zeolite catalyst.

The SCR system 160 also includes a bypass or flow regulation valve 175 in exhaust receiving communication with the DPF 150. The bypass valve 175 is in electronic communication with the controller 130, which selectively controls actuation of the valve. The bypass valve 175 is actuatable between an open position and a closed position. In the open position, the bypass valve 175 diverts all exhaust gas from the DPF 150 into the low temperature SCR catalyst 165. Conversely, in the closed position, the bypass valve 175 diverts no portion of the exhaust gas into the low temperature SCR catalyst 165. In other words, in the closed position, the bypass valve 175 bypasses the low temperature SCR catalyst 165. In certain implementations, the bypass valve 175 is positionable in any of various positions between the open and closed positions to selectively regulate the flow rate of exhaust gas into the low temperature SCR catalyst 165. In other words, the bypass valve 175 can be controlled to allow any of various portions of exhaust gas from the DPF 150 to flow into the low temperature SCR catalyst 165.

In some implementations of the engine system 100, when at least some portion of the exhaust is diverted through the low temperature SCR catalyst 165, the normal-to-high temperature SCR catalyst 170 may act to adsorb ammonia that has slipped from the low temperature SCR catalyst. Additionally, if the temperature of the catalyst bed of the normal-to-high temperature SCR catalyst 170 is above a threshold (e.g., above between about 150° C. and about 175° C.), the normal-to-high temperature SCR catalyst can convert $NO_x$ that has slipped from the low temperature SCR catalyst 165.

Generally, in some embodiments, the system 100 is desirable if the low temperature SCR catalyst 165 is highly susceptible to decay or deterioration at high exhaust temperatures. If the temperature of exhaust gas in the after-treatment system reaches such high exhaust temperatures, the bypass valve is configured to direct exhaust gas around the low temperature SCR catalyst 165 such that the low temperature SCR catalyst is not exposed to the high temperature exhaust. In this manner, the low temperature SCR catalyst 165 can be used to reduce $NO_x$ at low exhaust temperatures in an engine system capable of reaching temperatures high enough to degrade the low temperature SCR catalyst 165.

The SCR system 160 also includes a reductant delivery system 180 with a reductant source, pump and delivery mechanism or injector (not shown). The reductant source can be a container or tank capable of retaining a reductant, such as, for example, ammonia ($NH_3$) and urea, which decomposes to produce ammonia. The reductant source is in reductant supplying communication with the pump, which is configured to pump reductant from the reductant source to the delivery mechanism. The delivery mechanism can include a reductant injector or doser positioned downstream of the DPF 150 and upstream of the bypass valve 175 and SCR catalysts 165, 170. In alternative embodiments, the reductant injector can be positioned elsewhere in the after-treatment system 160, such as upstream of the DOC 140, and/or the reductant delivery system can include more than one reductant injector. In the illustrated embodiment, the injector is selectively controllable to inject reductant directly into the exhaust gas stream prior to passing through the bypass valve 175. In operation, the ammonia reacts with $NO_x$ in the presence of the SCR catalysts 165, 170 to reduce $NO_x$ to less harmful emissions, such as $N_2$ and $H_2O$.

The engine system 100 also includes various physical and/or virtual sensors, such as exhaust temperature sensors 190, 195. The exhaust temperature sensor 190 is positioned downstream of the engine 110 and upstream of the DOC 140 and the exhaust temperature sensor 195 is positioned downstream of the DPF 150 and upstream of the bypass valve 175. The exhaust temperature sensors 190, 195 can be a physical sensors and/or virtual sensors configured to determine (e.g., detect or estimate) a temperature of exhaust gas exiting the engine 110 and a temperature of exhaust gas exiting the DPF 150, respectively. Although not shown, the engine system 100 can include various other sensors, such as a differential pressure sensor for determining a pressure difference across the DPF 150, mass flow sensors for determining the mass flow rate of exhaust, and exhaust properties sensors for determining the mass concentrations of various compounds in the exhaust, such as $NO_x$, oxygen, nitrogen, ammonia, and the like. The various sensors may be strategically disposed throughout the engine system 100 and may be in communication with the controller 130 to monitor operating conditions of the system.

Figure 2:
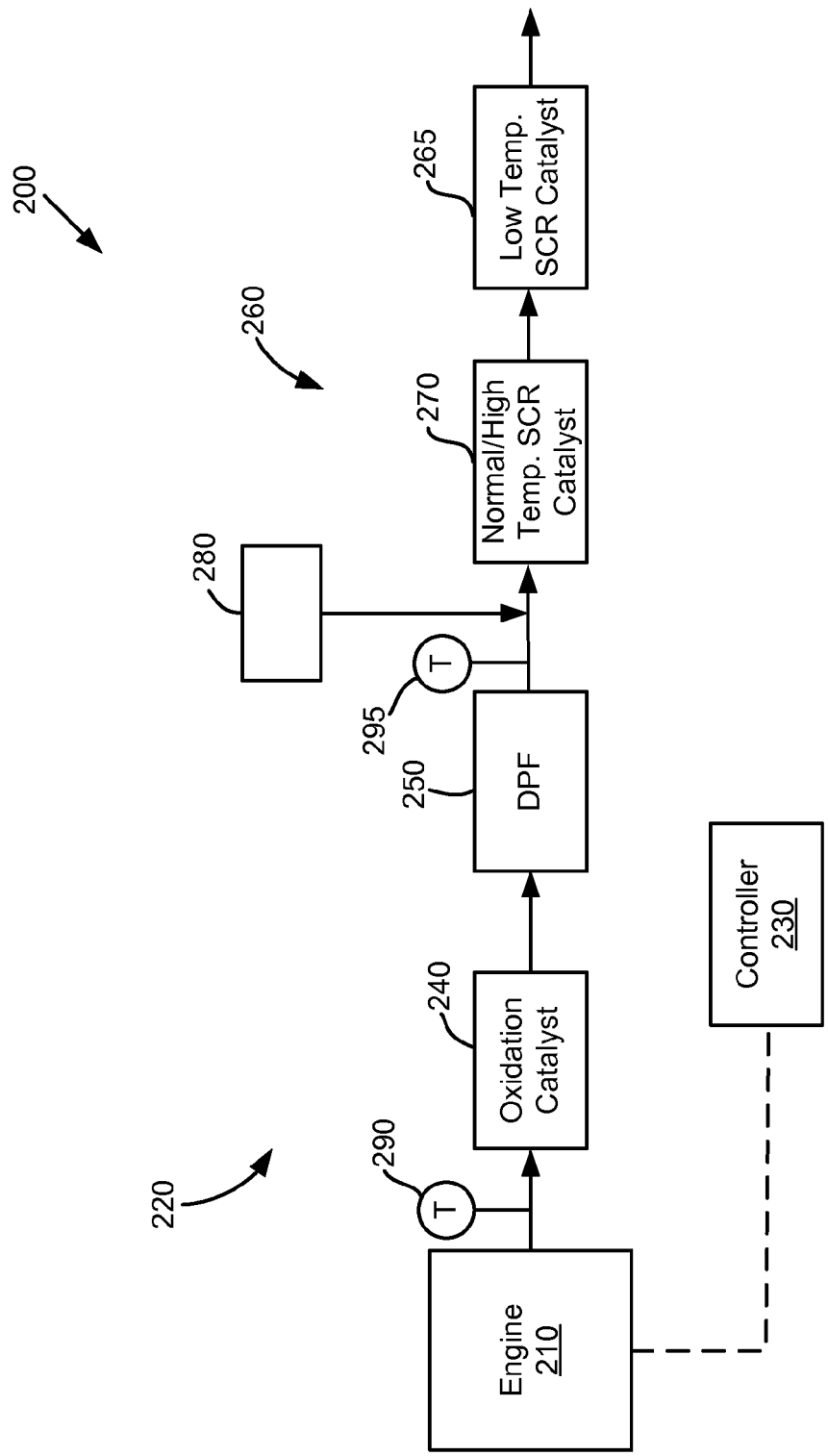
FIG. 2 is a schematic block diagram of an internal combustion engine system having an exhaust after-treatment system with a low temperature SCR catalyst downstream of a normal-to-high temperature SCR catalyst according to one representative embodiment.

FIG. 2 depicts one embodiment of an internal combustion engine system 200 similar to the engine system 100 of FIG. 1. Like the internal combustion engine system 100, the engine system 200 includes an exhaust after-treatment system 220 with an SCR system 260. The SCR system 260 includes a low temperature SCR catalyst 265 and a normal-to-high temperature SCR catalyst 270. Other features of the engine system 200 corresponding with features of the engine system 100 have like numbers. More specifically, the features of the engine system 200 that are similar to features of the engine system 100 are labeled with the same reference numbers but in a 200-series instead of the 100-series as used with engine system 100.

Unlike the SCR system 160, the SCR system 260 does not include a bypass valve. Accordingly, all exhaust gas exiting the DPF 250 is passed through the low temperature SCR catalyst 265. Additionally, the low temperature SCR catalyst 265 is downstream of the normal-to-high temperature SCR catalyst 270 and receives all the exhaust gas passing through the SCR catalyst 270. During some low exhaust temperature operating ranges (e.g., below the minimum operating temperature of the normal-to-high temperature SCR catalyst 270), the exhaust gas passes through the normal-to-high temperature SCR catalyst without any $NO_x$ being reduced. Accordingly, during such low exhaust temperature ranges, all the $NO_x$ reduction takes place within the low temperature SCR catalyst 265 after the exhaust gas passes through the normal-to-high temperature SCR catalyst 270. During certain intermediate exhaust temperatures, some of the $NO_x$ reduction takes place within the normal-to-high temperature SCR catalyst 270 and the other of the $NO_x$ reduction takes place within the low temperature SCR catalyst 265. Yet during certain high exhaust temperatures, all the NOx reduction takes place within the normal-to-high temperature SCR catalyst 270 and no NOx reduction takes place within the low temperature SCR catalyst 265.

Generally, in some embodiments, the system 200 is desirable if the maximum exhaust gas temperatures reached during operation of the engine 210 and after-treatment components (i.e., the DOC 240 and DPF 250) do not cause decay or deterioration of the low temperature SCR catalyst 165. In certain implementations, the low temperature SCR catalyst 165 is mechanically stable (i.e., does not decay) at exhaust temperatures below 450° C. In these implementations, the system 200 may be used if the maximum exhaust gas temperature during operation of the engine system 200 does not exceed 450° C. If, however, exhaust gas temperatures during operation of the engine system 200 may cause deterioration of the low temperature SCR catalyst 265, the system 200 may be reconfigured to include an exhaust bypass valve and associated line as described above in relation to engine system 100.

Figure 3:
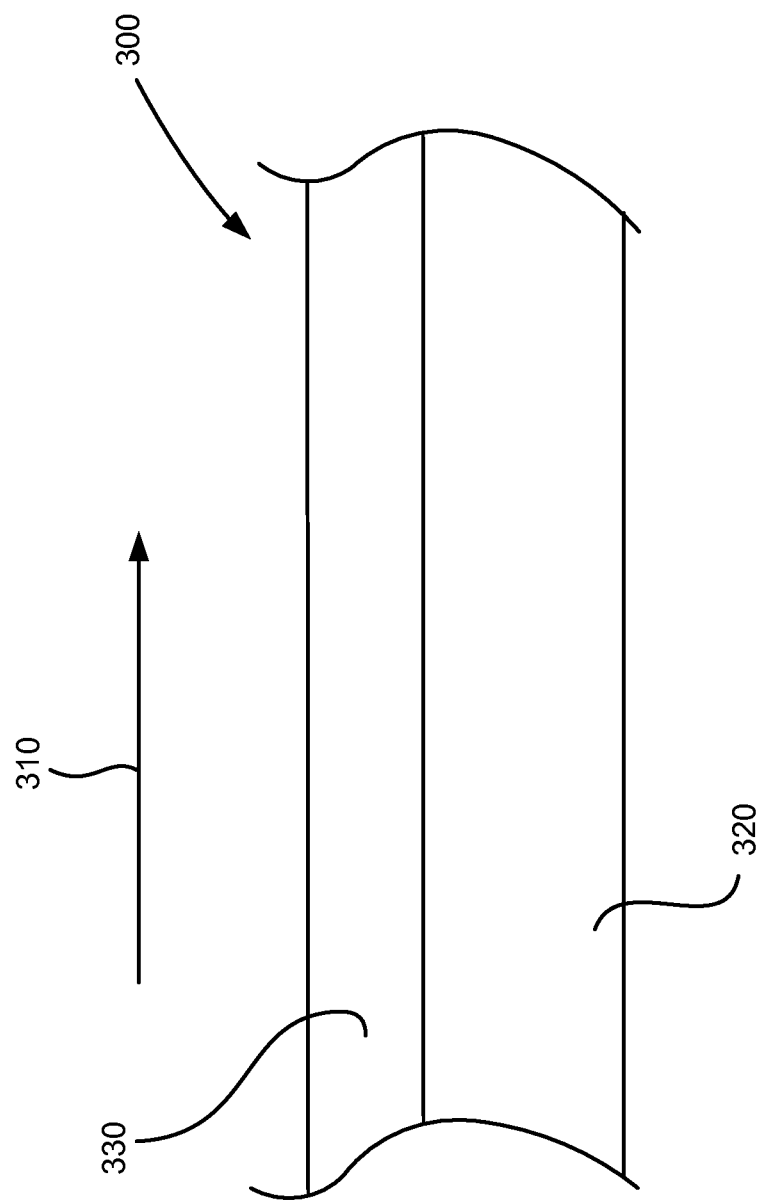
FIG. 3 is a side view of a low temperature SCR catalyst wall according to one representative embodiment.

The low temperature SCR catalysts 165, 265 of the engine systems 100, 200, respectively, are similarly configured. Generally, each low temperature SCR catalyst 165, 265 includes a catalyst bed exposed to the exhaust gas stream flowing through the catalyst. The catalyst bed can be integrated into a honeycomb shaped or plated SCR catalyst as is known in the art. Referring to FIG. 3, the low temperature SCR catalysts 165, 265 can include a bed, such as the catalyst bed 300 of FIG. 3. The catalyst bed 300 includes a carrier layer 320 and a catalytic layer 330. The catalytic layer 330 is exposed to pollutants (e.g., $NO_x$) contained in an exhaust flow stream flowing past the layer as indicated by directional arrow 310. The pollutants react with the catalytic layer 330 in the presence of a reductant, such as ammonia, to reduce the $NO_x$ to less harmful pollutants.

The carrier layer 320 and catalytic layer 330 are each made from specifically selected materials to effectively reduce pollutants in the exhaust gas stream. However, as discussed above, many conventional materials do not sufficiently reduce $NO_x$ from the exhaust gas stream when the temperature of the exhaust is low (e.g., between about 60° C. and about 250° C.), such as just after a cold start of the engine 110 until the engine has sufficiently "warmed-up."

According to the present disclosure, the combination of materials for the carrier and catalytic layers 320, 330 has been uniquely selected to provide a catalyst bed 300 capable of sufficiently reducing $NO_x$ in low exhaust temperature conditions. According to some embodiments, the carrier layer 320 is made from one or more of the following oxides: $T_iO_2$, $Al_2O_3$, $SiO_2$, $ZrO_2$, $GaO_2$, $TiO_2$—$Al_2O_3$, $TiO_2$—$SiO_2$, $TiO_2$—$GaO_2$, $TiO_2$—$ZrO_2$, $CeO_2$, $CeO_2$—$ZrO_2$, $Al_2O_3$—$SiO_2$, $Al_2O_3$—$ZrO_2$, $TiO_2$—$SiO_2$—$ZrO_2$, and $TiO_2$—$Al_2O_3$—$SiO_2$, and other similar oxides. Similarly, according to some embodiments, the catalytic layer 330 is made from one or more of the following transition metals: V, Cr, Mn, Fe, Co, Ni, Cu, Zn, Mo, Ag, Ge, Nb, and other similar materials. In one particular embodiment, the bed 300 includes a carrier layer 320 and catalytic layer 330 made from a unique combination of one of the respective oxides and transition metals listed above. The unique combination can be selected or adjusted based on conditions in which an SCR catalyst will be operated and the desired $NO_x$ conversion efficiency at low exhaust gas temperatures. For example, in some implementations, the bed 300 includes a carrier layer 320 made from $TiO_2$ and a catalyst layer 330 made from one of Mn, Cr, Cu, Co, Fe, V, and Ni. In one specific implementation, the carrier layer 320 is made from $TiO_2$ and the catalyst layer 330 is made from Mn.

Figure 4:
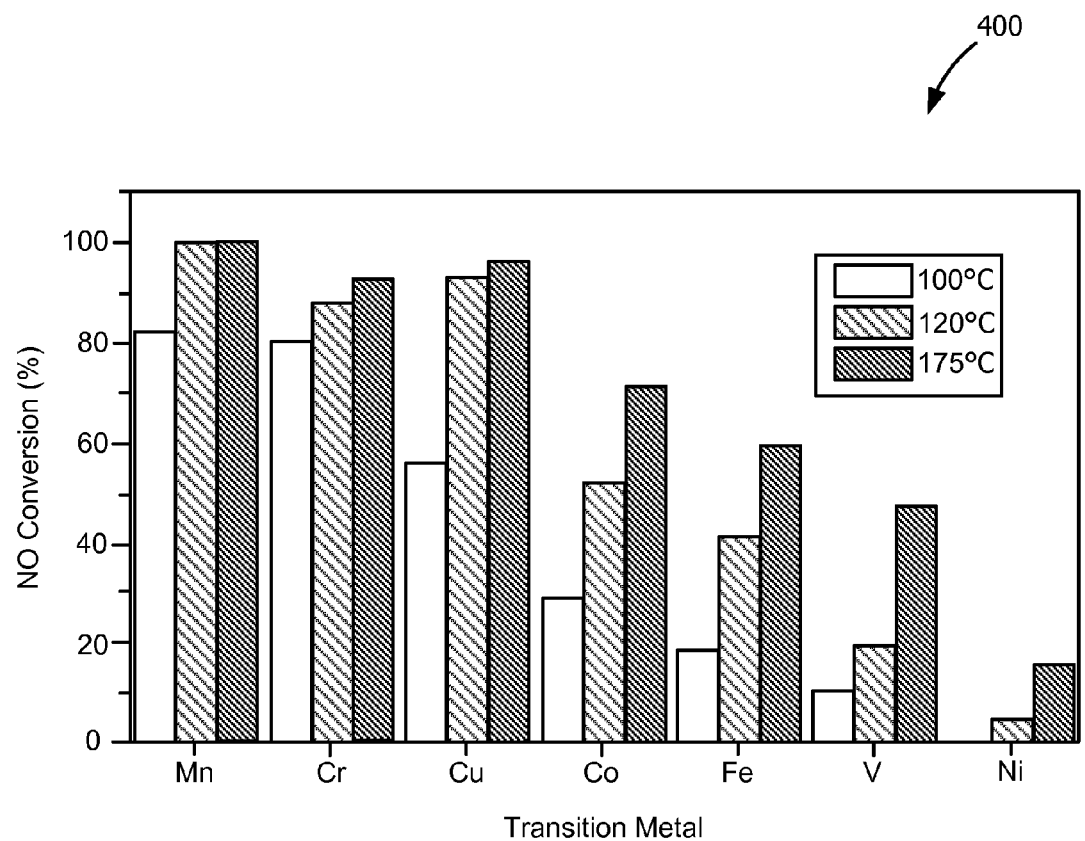
FIG. 4 is a graph illustrating a comparison between NO conversion percentage and various transition metal types for low temperature SCR catalysts at several exhaust gas temperatures.

Referring to FIG. 4, catalyst beds 300 each with a carrier layer 320 made from $TiO_2$ and a catalytic layer 330 made from a respective one of Mn, Cr, Cu, Co, Fe, V, and Ni were analyzed under the same testing conditions to determine the efficiency of NO conversion to $N_2$ at three low exhaust temperatures (i.e., 100° C., 120° C., and 175° C.). As shown in FIG. 4, the catalyst bed 300 with a catalytic layer 330 made from Mn exhibited the highest $NO_x$ conversion efficiency at each of the three low exhaust temperatures. For example, even at an exhaust temperature of 100° C., the bed 300 with catalyst layer 330 made from Mn provided a $NO_x$ conversion efficiency of greater than 80%. Also, as shown with the bed 300 having a catalyst layer 330 made from Mn, 100% $NO_x$ conversion efficiency is attained at exhaust temperatures as low as 120° C. The exhaust conditions during the testing of the catalyst beds 300 included: Gas Hour Space Velocity=$8000\,h^{-1}$, NO=$NH_3$=2000 ppm, 2% $O_2$, and He balance.

In addition to high $NO_x$ conversion efficiency at low exhaust gas temperatures, the catalyst beds 300 with carrier layers 320 and catalytic layers 330 made from a unique combination of one of the respective oxides and transition metals listed above provide a low affinity or high tolerance for $SO_2$ and water. Accordingly, the catalyst beds 300 maintained a high $NO_x$ conversion efficiency at low exhaust gas temperatures even when high levels of $SO_2$ and water were present in the exhaust gas.

Further, low exhaust temperature SCR catalysts with the catalyst beds 300 described above can be produced at a low cost and remain mechanically stable at exhaust gas temperatures up to, and in some cases above, 450° C.

Referring back to FIG. 1, the controller 130 controls the operation of the engine system 100 and associated sub-systems, such as the engine 110 and exhaust gas after-treatment system 120. The controller 130 is depicted in FIG. 1 as a single physical unit, but can include two or more physically separated units or components in some embodiments if desired. Generally, the controller 130 receives multiple inputs, processes the inputs, and transmits multiple outputs. The multiple inputs may include sensed measurements from the sensors and various user inputs. The inputs are processed by the controller 130 using various algorithms, stored data, and other inputs to update the stored data and/or generate output values. The generated output values and/or commands are transmitted to other components of the controller and/or to one or more elements of the engine system 100 to control the system to achieve desired results, and more specifically, achieve desired exhaust gas emissions.

In certain embodiments, the controller 130 includes one or more modules configured to control operation of the SCR system 260. More specifically, the controller 130 issues commands to the reductant delivery system 180 for dosing reductant into the exhaust gas stream and to the bypass valve 175 for controlling the flow of exhaust gas into the low temperature SCR catalyst 165. In certain implementations, the controller 130 receives input from temperature sensors 190, 195 to determine the exhaust gas temperature exiting the engine 110 and DPF 150, respectively. Based at least partially on one of the determined exhaust gas temperatures, the controller 130 may issue a command to the bypass valve 175 to at least partially open to allow at least a portion of the exhaust gas to flow through the low temperature SCR catalyst 165. The controller 130 issues the command to the bypass valve 175 if one of the determined exhaust gas temperatures is below a predetermined threshold, such as the upper limit of a predetermined exhaust cold temperature range. The range can be based on the configuration of the engine system 100 and any of various external factors, such as ambient temperature, whether regeneration events are occurring, and the like. In one implementation, for example, if the temperature of exhaust exiting the DPF 150 is below an exhaust cold temperature threshold, then the controller 130 commands the bypass valve 175 to open.

In one embodiment, the openness of the bypass valve 175 is based at least partially on proximity of the determined exhaust gas temperature to the predetermined threshold. For example, if the determined exhaust gas temperature is well below the predetermined threshold, then the controller 130 will issue a command to fully open the bypass valve 175 to allow all (e.g., 100%) the exhaust gas exiting the DPF 150 to first pass through the low temperature SCR catalyst 165 before passing through the normal-to-high temperature SCR catalyst 170. In certain implementations, the exhaust gas temperature is well below the predetermined threshold when the temperature drops below a minimum operating temperature of the normal-to-high temperature SCR catalyst. The minimum operating temperature of the normal-to-high temperature SCR catalyst can be associated with the temperature at which the normal-to-high temperature SCR fails to reduce an effective amount of $NO_x$ (e.g., 0% $NO_x$ reduction). As the determined temperature of the exhaust gas exiting the DPF 150 increases (e.g., increases from a minimum operating temperature of the normal-to-high temperature SCR catalyst toward the predetermined threshold), the controller 130 will issue commands to incrementally and proportionally close the valve 175 until the valve is fully closed as the determined exhaust temperature reaches the threshold.

Although the temperature of exhaust gas in the system 100 in the above embodiments is described as being determined based on readings from one or more physical temperature sensors, in other embodiments the exhaust temperature in the system is determined using virtual sensors and feedforward models. The use of virtual sensors and feedforward models can be used instead of or in conjunction with physical sensors.

Figure 5:
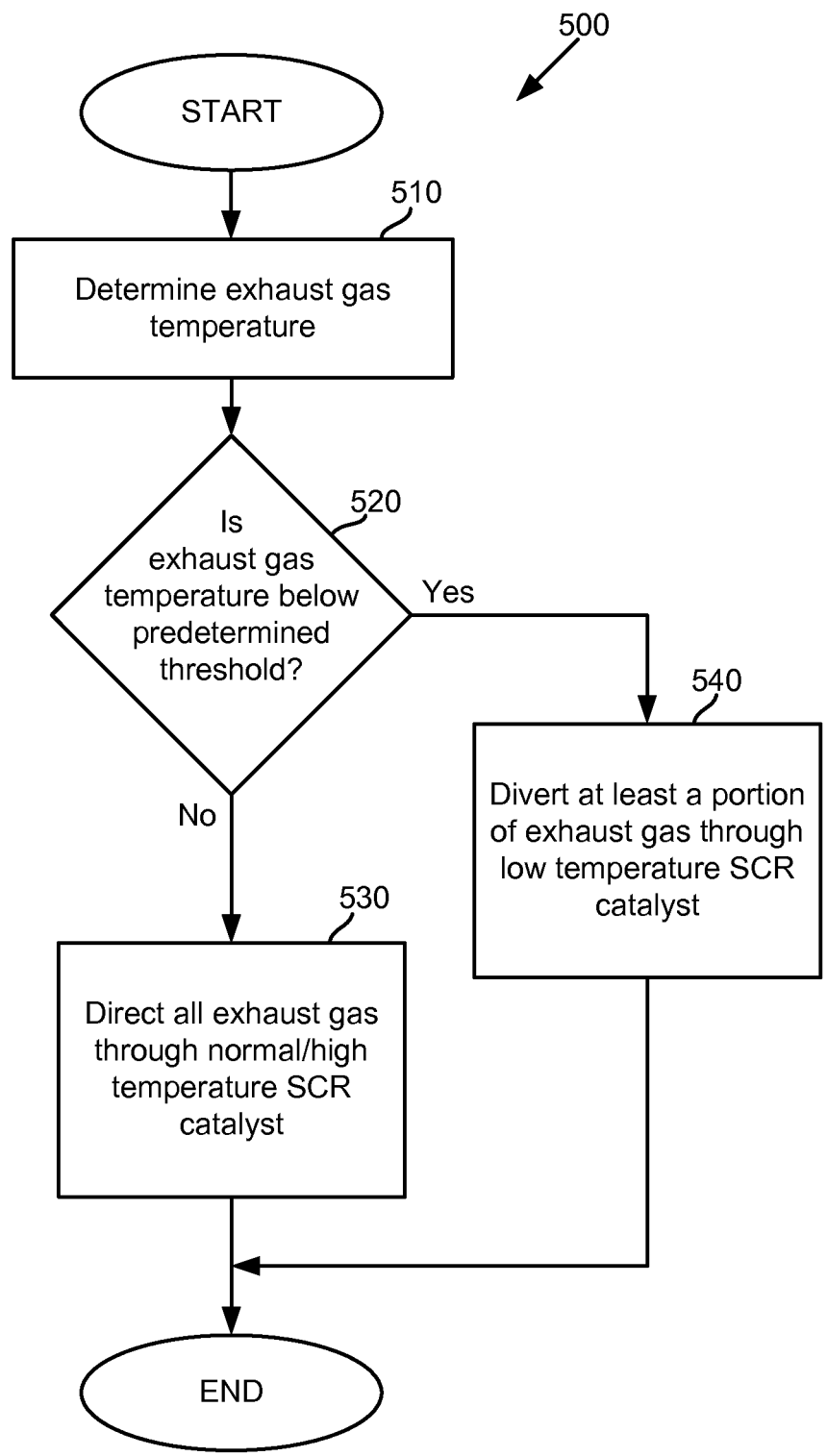
FIG. 5 is a flow chart diagram of a method for treating exhaust gas in an SCR system of an exhaust after-treatment system according to one representative embodiment.

FIG. 5 illustrates a method 500 for treating exhaust gas in an SCR system of an exhaust after-treatment system, such as those described above. The method 500 substantially includes the actions to carry out the functions presented above with respect to the operation of the engine system 100 of FIG. 1. The method 500 starts at 510 by determining the exhaust gas temperature at a location within the system 100. The location can correspond with an exit of the engine 110 or exit of the DPF 150. In most implementations, the location corresponds with the exit of the DPF 150 or just upstream of the SCR catalysts 165, 170. The method 500 continues to determine at 520 whether the determined exhaust gas temperature is below a predetermined threshold. As discussed above, the predetermined threshold can correspond with an upper limit of an exhaust cold temperature range. If the determined exhaust gas temperature is below the threshold, then the method 500 proceeds to divert at least a portion of exhaust gas through a low temperature SCR catalyst at 540. In some implementations, if the determined exhaust gas temperature is below the threshold by any amount, all the exhaust gas is diverted through the low temperature SCR catalyst. In other implementations, however, only a portion of the exhaust gas proportional to the proximity of the determined exhaust gas temperature from the threshold is diverted through the low temperature SCR catalyst.

If the determined exhaust gas temperature is above the predetermined threshold as determined at 520, then the method 500 proceeds to direct all the exhaust gas through a normal-to-high temperature SCR catalyst at 530. In other words, at 530, no portion of the exhaust gas is diverted through a low temperature SCR catalyst.

Referring back to FIG. 2, in operation, the low temperature SCR catalyst 265 of the engine system 200 provides the same or similar advantages as the low temperature SCR catalyst 165 of the engine system 100 described above. Although the engine system 200 does not include a bypass valve, the low temperature SCR catalyst 265 is still able to convert $NO_x$ at a high efficiency during low exhaust temperature operation of the engine 210. Generally, at low exhaust gas temperatures, the normal-to-high temperature SCR catalyst 270 is unable to efficiently convert $NO_x$ in the exhaust gas stream. Accordingly, exhaust gas exiting the SCR catalyst 270 includes excess amounts of $NO_x$ that the low temperature SCR catalyst 265 can efficiently convert the excess $NO_x$ in the same manner as the low temperature SCR catalyst 265. As the exhaust gas temperature approaches the upper limit of the low exhaust temperature range, $NO_x$ reduction on the low temperature SCR catalyst 265 decreases and $NO_x$ reduction on the normal-to-high temperature SCR catalyst 270 increases. Ultimately, most, if not all, of the $NO_x$ reduction of the SCR system 260 takes place within the normal-to-high temperature SCR catalyst 270 at normal-to-high exhaust temperature ranges. In certain implementations, at normal-to-high exhaust temperatures, there is little to no $NO_x$ in the exhaust gas as it enters the low temperature SCR catalyst 270 and any remaining ammonia in the exhaust gas is oxidized by the low temperature SCR catalyst.

In some embodiments, the controller 230 of the engine system 200 may be configured to control the operation of the engine 210, oxidation on the DOC 240, and/or regeneration of the DPF 250 such that the exhaust gas entering the low temperature SCR catalyst 265 does not reach a temperature that could decay the low temperature SCR catalyst.

It is noted that the above-described embodiments are applicable to internal combustion engines in mobile applications, such as automobiles, tractors, and trucks, or stationary applications, such as boilers and other industrial applications.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Modules may be implemented in a computer readable medium, which may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

The subject matter of the present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An exhaust gas after-treatment system coupleable in exhaust gas stream receiving communication with an internal combustion engine, comprising:
   a low temperature selective catalytic reduction (SCR) catalyst configured to reduce $NO_x$ in exhaust gas having a temperature below a temperature threshold;
   a normal-to-high temperature SCR catalyst configured to reduce $NO_x$ in exhaust gas having a temperature above the temperature threshold; and
   an exhaust bypass valve configured to direct at least a portion of an exhaust gas stream through the low temperature SCR catalyst if a temperature of the exhaust gas stream is below the temperature threshold, and direct all of the exhaust gas stream through the normal-to-high temperature SCR catalyst if the temperature of the exhaust gas stream is above the temperature threshold.

2. The exhaust gas after-treatment system of claim 1, wherein the bypass valve is configured to direct all of the exhaust gas stream through the low temperature SCR catalyst if a temperature of the exhaust gas stream is below a minimum operating temperature of the normal-to-high temperature SCR catalyst, wherein the minimum operating temperature is lower than the temperature threshold.

3. The exhaust gas after-treatment system of claim 2, wherein the bypass valve is configured to incrementally decrease the amount of the exhaust gas stream flowing into the low temperature SCR catalyst from 100% to 0% of the exhaust gas stream as the temperature of the exhaust gas stream correspondingly increases from the minimum operating temperature to the temperature threshold.

4. The exhaust gas after-treatment system of claim 2, wherein the bypass valve is configured to incrementally decrease the amount of the exhaust gas stream flowing into the low temperature SCR catalyst from 0% to 100% of the exhaust gas stream as the temperature of the exhaust gas stream correspondingly decreases from the temperature threshold to the minimum operating temperature.

5. The exhaust gas after-treatment system of claim 1, wherein the temperature threshold comprises a degradation temperature of the low temperature SCR catalyst.

6. The exhaust gas after-treatment system of claim 1, wherein the bypass valve is positioned upstream of the low and normal-to-high temperature SCR catalysts, and wherein the low temperature SCR catalyst is positioned upstream of the normal-to-high temperature SCR catalyst.

7. The exhaust gas after-treatment system of claim 1, wherein the normal-to-high temperature SCR catalyst is positioned downstream of the low temperature SCR catalyst and receives all of the exhaust gas that flows through the low temperature SCR catalyst.

8. The exhaust gas after-treatment system of claim 1, wherein the low temperature SCR catalyst is positioned downstream of the normal-to-high temperature SCR catalyst and receives all of the exhaust gas that flows through the normal-to-high temperature SCR catalyst.

9. The exhaust gas after-treatment system of claim 1, wherein the temperature threshold is between about 150° C. and about 250° C.

10. The exhaust gas after-treatment system of claim 1, wherein the low temperature SCR catalyst comprises:
a carrier layer made from a material selected from the group consisting of $TiO_2$, $Al_2O_3$, $SiO_2$, $ZrO_2$, $GaO_2$, $TiO_2$—$Al_2O_3$, $TiO_2$—$SiO_2$, $TiO_2$—$GaO_2$, $TiO_2$—$ZrO_2$, $CeO_2$, $CeO_2$—$ZrO_2$, $Al_2O_3$—$SiO_2$, $Al_2O_3$—$ZrO_2$, $TiO_2$—$SiO_2$—$ZrO_2$, and $TiO_2$—$Al_2O_3$—$SiO_2$; and
a catalytic layer coupled to the carrier layer, the catalytic layer being made from a material selected from the group consisting of V, Cr, Mn, Fe, Co, Ni, Cu, Zn, Mo, Ag, Ge, and Nb.

11. The exhaust gas after-treatment system of claim 10, wherein the combined carrier layer and catalytic layer are configured to reduce $NO_x$ in an exhaust gas stream at an exhaust temperature between about 60° C. and about 250° C.

12. The exhaust gas after-treatment system of claim 10, wherein the carrier layer is made from $TiO_2$ and the catalytic layer is made from one of Mn, Cr, Cu, Co, Fe, V, and Ni.

13. The exhaust gas after-treatment system of claim 10, carrier layer is made from $TiO_2$ and the catalytic layer is made from Mn.

14. The exhaust gas after-treatment system of claim 10, wherein the carrier layer is made from $TiO_2$ and the catalytic layer is made from Cr.

15. The exhaust gas after-treatment system of claim 10, wherein the carrier layer is made from $TiO_2$ and the catalytic layer is made from Cu.

16. The exhaust gas after-treatment system of claim 10, wherein the combined carrier layer and catalytic layer are configured to reduce 100% of $NO_x$ in an exhaust stream at an exhaust temperature less than about 175° C.

* * * * *